United States Patent
Hourselt et al.

(10) Patent No.: US 9,058,400 B2
(45) Date of Patent: Jun. 16, 2015

(54) HTTP PERFORMANCE ENHANCEMENT BASED ON DELTA TRANSFER

(75) Inventors: Andrew G. Hourselt, Tucson, AZ (US); Pei Ming Hu, Shanghai (CN); Wen Gang Luo, Shanghai (CN); Hui Yang, Shanghai (CN); Yuan Yin, Changzhou (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 205 days.

(21) Appl. No.: 13/585,901

(22) Filed: Aug. 15, 2012

(65) Prior Publication Data

US 2014/0052772 A1 Feb. 20, 2014

(51) Int. Cl.
*G06F 15/16* (2006.01)
*G06F 17/30* (2006.01)

(52) U.S. Cl.
CPC .................................. *G06F 17/3089* (2013.01)

(58) Field of Classification Search
CPC ................. G06F 17/30905; G06F 17/30902; G06F 17/3089; G06F 17/30899; H04L 67/02; H04L 67/28; H04L 67/2823; H04L 67/2828
USPC .................................. 709/203; 715/234, 235
See application file for complete search history.

(56) References Cited

U.S. PATENT DOCUMENTS

| 6,021,426 | A | 2/2000 | Douglis et al. |
| 7,346,842 | B1 * | 3/2008 | Hayton et al. ................. 715/234 |
| 7,523,158 | B1 * | 4/2009 | Nickerson et al. ............ 709/203 |
| 7,831,556 | B2 | 11/2010 | Behl et al. |
| 8,103,953 | B2 | 1/2012 | McKellar et al. |
| 2007/0143672 | A1 * | 6/2007 | Lipton et al. ................... 715/530 |
| 2008/0028302 | A1 * | 1/2008 | Meschkat ...................... 715/255 |
| 2008/0104025 | A1 | 5/2008 | Dharamshi et al. |
| 2010/0017702 | A1 * | 1/2010 | Carroll et al. ................. 715/234 |
| 2010/0250706 | A1 * | 9/2010 | Burckart et al. .............. 709/219 |
| 2010/0299676 | A1 * | 11/2010 | Lopez ............................ 719/311 |
| 2013/0073948 | A1 * | 3/2013 | Bryar et al. .................... 715/234 |
| 2013/0212462 | A1 * | 8/2013 | Athas et al. .................... 715/234 |

OTHER PUBLICATIONS

IBM, "Method for Optimizing the Refresh of Dynamic Web Pages", Apr. 16, 2007, IP.com [online], [retrieved on Jun. 19, 2012]. Retrieved from: Prior Art Database, IP.com No. IPCOM000150044D.

Internet Society Requests for Comment (RFCS) et al., "Delta Encoding in HTTP (RFC3229)", Jan. 16, 2002, IP.com [online], [retrieved on Jun. 19, 2012]. Retrieved from: Prior Art Database, IP.com No. IPCOM000006597D.

dev.chromium.org, "SPDY: An experimental protocol for a faster web—The Chromium Projects" dev.chromium.org [online], [retrieved on Jun. 19, 2012]. Retrieved from the Internet <URL: http://dev.chromium.org/spdy/spdy-whitepaper>.

* cited by examiner

*Primary Examiner* — Brian J Gillis
*Assistant Examiner* — Austin Moreau
(74) *Attorney, Agent, or Firm* — Zilka-Kotab, PC

(57) ABSTRACT

A method, computer program product, and computer system for client-server communication based on delta transfer. A server of the computer system receives from a client a HTTP request for transferring a current image page, compares the current image page and a saved image page which is stored on the server for the client. Based on the comparison, the server of the computer system constructs delta contents between the current image page and the saved image page. The server of the computer system updates the saved image page on the server with the current image page and sends a HTTP response comprising the delta contents to the client.

9 Claims, 5 Drawing Sheets

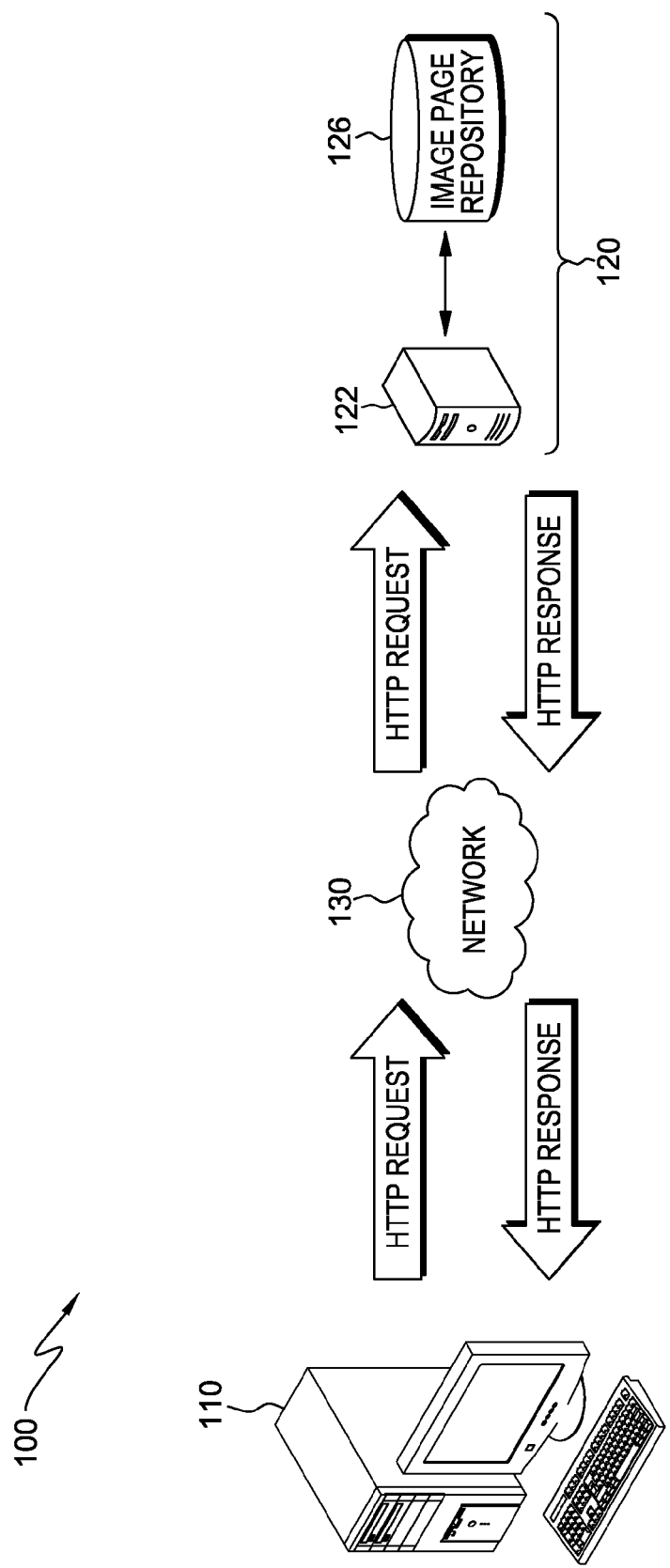

HTTP PERFORMANCE ENHANCEMENT BASED ON DELTA TRANSFER

FIELD OF THE INVENTION

The present invention relates generally to HTTP as a request-response protocol in a client-server computing model, and more particularly to HTTP performance enhancement based on delta transfer.

BACKGROUND

HTTP functions as a request-response protocol in the client-server computing model. In HTTP, a web browser acts as a client, while an application running on a computer hosting a web site functions as a server. The client submits a HTTP request for a HTTP page to the server. In response to the HTTP request, the server returns a HTTP response to the client. Normally, the HTTP response by the server fetches all the contents of the HTTP page and passes all the contents to the client. Therefore, duplicated/redundant data are transmitted via a network. To overcome this problem, AJAX (Asynchronous JavaScript and XML) is introduced to partly refresh web contents. AJAX is a group of interrelated web development techniques used on the client-side to create asynchronous web applications, and AJAX-based web applications are growing in popularity. In addition, there are technologies of delta transfer and diff transfer based on HTTP, such as Apache Subversion (SVN).

SUMMARY

Embodiments of the present invention provide a method, computer program product, and computer system for client-server communication based on delta transfer. A server of the computer system receives from a client a HTTP request for transferring a current image page. The server of the computer system compares the current image page and a saved image page, wherein the saved image page is stored on the server for the client. The server of the computer system constructs delta contents between the current image page and the saved image page. The server of the computer system updates the saved image page with the current image page. And, the server of the computer system sends a HTTP response comprising the delta contents to the client.

BRIEF DESCRIPTION OF THE SEVERAL VIEWS OF THE DRAWINGS

FIGS. 1A and 1B are diagrams illustrating a system of a client and a server connected by a network, in accordance with an exemplary embodiment of the present invention.

DETAILED DESCRIPTION

Figure 1B:
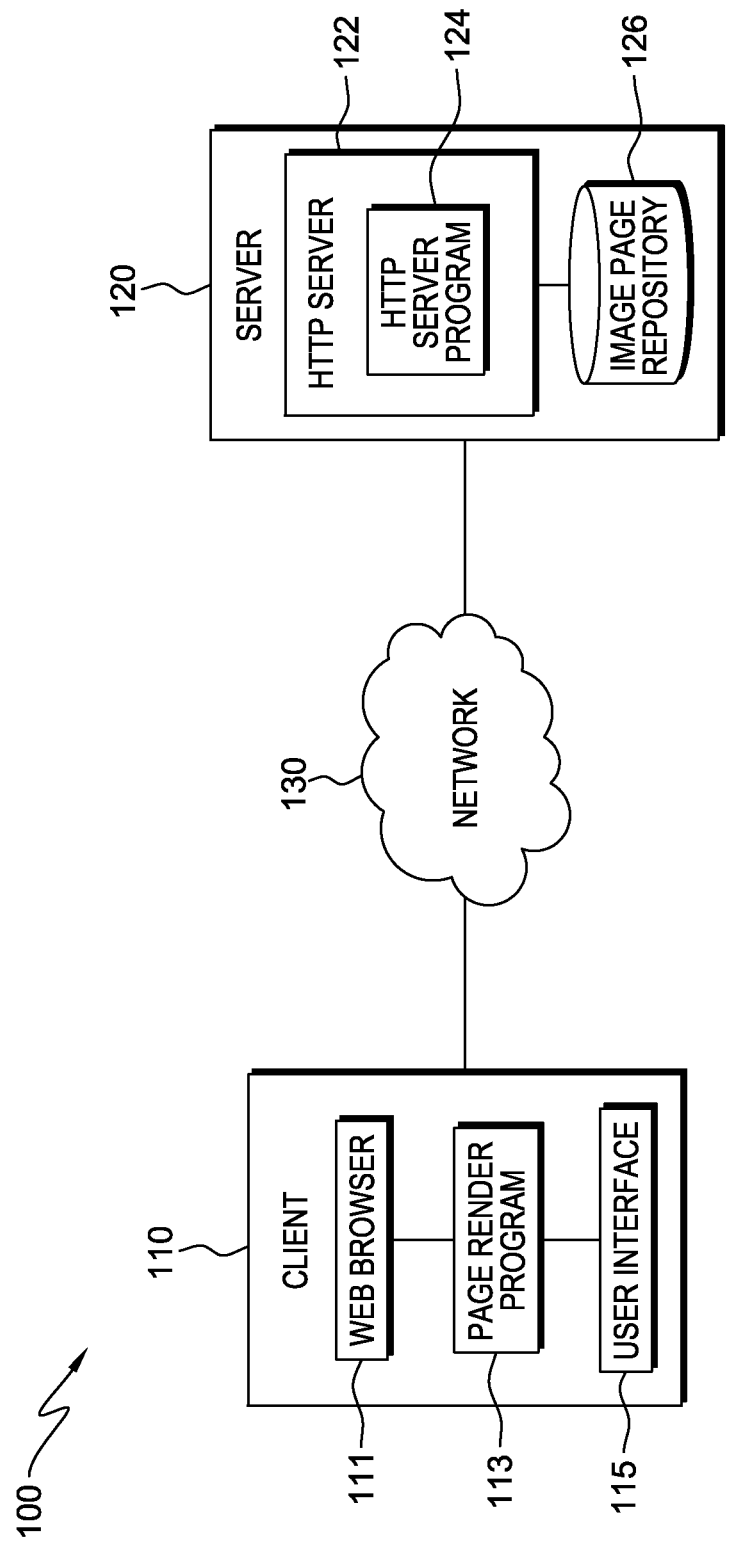

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The term of "computer readable storage medium" or "one or more computer-readable tangible storage devices", as used in this document, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1A and 1B are diagrams illustrating system 100 comprising client 110 and server 120 connected by network 130, in accordance with an exemplary embodiment of the present invention. Server 120 comprises HTTP server 122 and image page repository 126. Server 120 is a computing system capable of receiving and sending data to and from client 110 via network 130. In the exemplary embodiment, server 120 is a computing device that is optimized for the support of websites which reside on server 120, and for the support of network requests related to websites which reside on server 120. Client 110 may be a desktop computer, a notebook, a laptop computer, a tablet computer, a handheld device, a smartphone, a thin client, or any other electronic device capable of receiving input from a user, executing computer program instructions, and communicating with server 120 via network 130.

Client 110 submits a HTTP request to server 120 through network 130. Server 120 stores contents of HTTP pages on image page repository 126, provides resources such as HTML files, performs other functions on behalf of client 110, and returns a HTTP response to client 110 through network 130. In other embodiments, server 120 may store the contents of HTTP pages on a file system of server 120.

Referring to FIG. 1B, HTTP server 122 comprises HTTP server program 124. In response to receiving a HTTP request from client 110 for a current image page, HTTP server program 124 does not return a complete current page. However, server 120 calculates the delta between the current page at a present time and a saved image page at a prior time, and then transfers delta contents back to client 110 through network 130. The saved image page is stored for client 110 on image page repository 126 of server 120. HTTP server program 124 updates the saved image page with the current image page, on image page repository 126. Operational steps of HTTP server program 124 are discussed in greater detail in later paragraphs with reference to FIG. 2.

Client 110 comprises web browser 111, page render program 113, and user interface 115. User interface 115 receives input from a user and transmits the input to an application. Web browser 111 is a program that enables users to view, watch, or listen to documents and other resources, such as audio and video files, retrieved from a network device. In the exemplary embodiment, web browser 111 requests for transferring the current image page from server 120 via network 130. Page render program 113 receives the delta contents from server 120. Page render program 113 refreshes a HTTP page, based on the delta contents. In this framework, client 110 does not need to implement extra programming such as AJAX which is widely used. Operational steps of page render program 113 are discussed in greater detail in later paragraphs with reference to FIG. 3.

Figure 2:
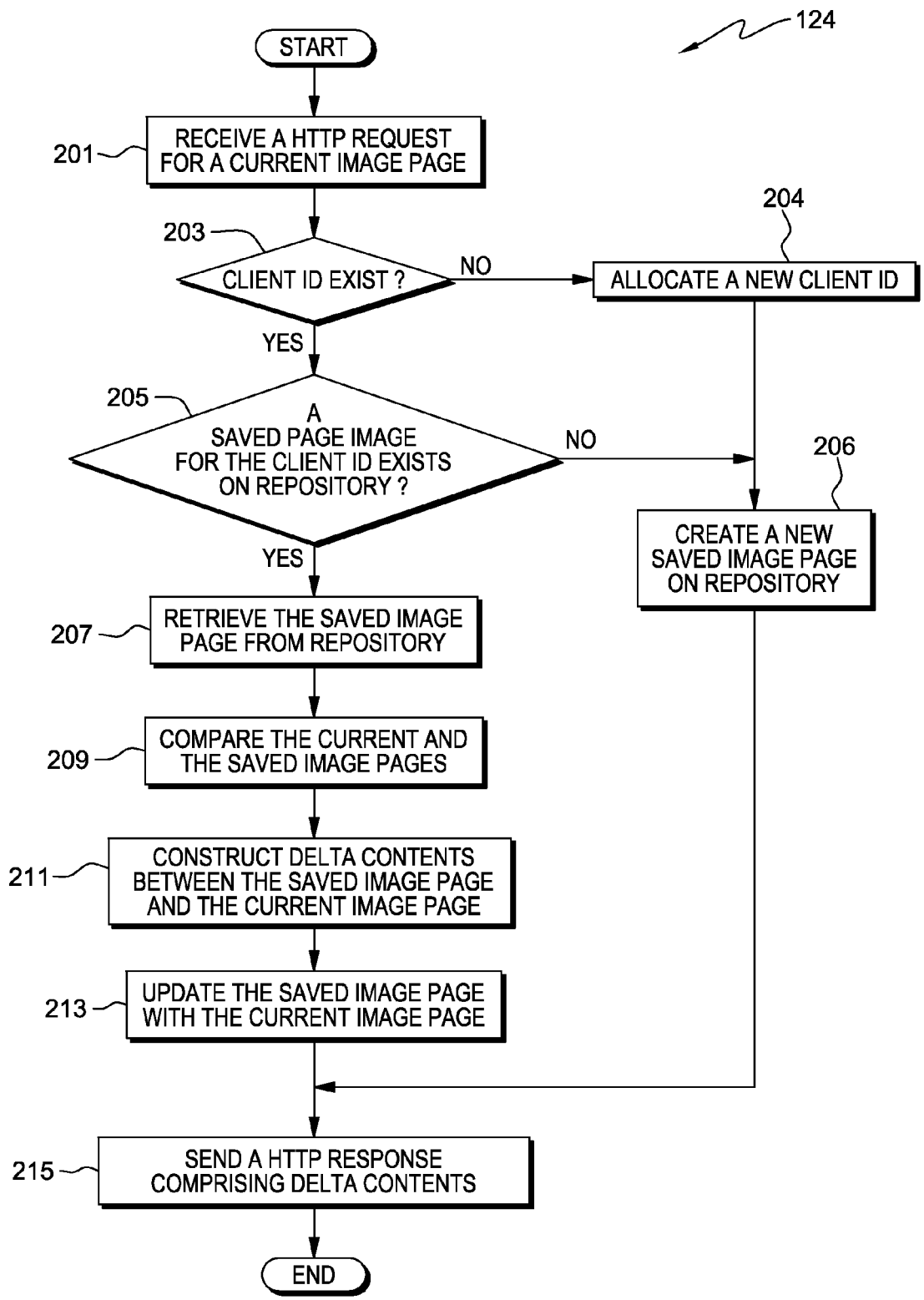
FIG. 2 is a flowchart illustrating operational steps of a HTTP server program on the server shown in FIGS. 1A and 1B, in accordance with an exemplary embodiment of the present invention.

FIG. 2 is a flowchart illustrating operational steps of HTTP server program 124 on server 120 shown in FIGS. 1A and 1B, in accordance with an exemplary embodiment of the present invention. At step 201, HTTP server program 124 receives, from client 110, a HTTP request for a current image page. At decision block 203, HTTP server program 124 determines whether a client ID exists for client 110. The client ID is used for HTTP server program 124 to identify a saved image page which is stored on image page repository 126 specifically for client 110. In the exemplary embodiment, a table on image page repository 126 includes relationship entries: client ID, URL, image page path, and time stamp.

In response to determining that the client ID does not exist (NO branch of decision block 203), at step 204, HTTP server program 124 allocates a new client ID to client 110. For example, when client 110 requests a specific image page at a first time, the relationship entries in the table do not exist specifically for client 110; therefore, HTTP server program 124 allocates a new client ID and builds relationship entries for client 110. Then, at step 206, HTTP server program 124 creates a new saved image page for the client ID on image page repository 126. Under this particular situation, HTTP server program 124 uses whole contents of the new saved image page as delta contents. At step 215, server program 124 sends a HTTP response comprising the delta contents and the new client ID which is written into a cookie. The new client ID will be used in future requests by client 110.

In response to determining that the client ID exists (YES branch of decision block 203), HTTP server program 124, at decision block 205, determines whether a saved page image for client 110 exists on image page repository 126. In response to determining that the saved image page for client 110 does not exist (NO branch of decision block 205), at step 206, HTTP server program 124 creates a new saved image page for client 110 on image page repository 126. Under this particular situation, HTTP server program 124 uses whole contents of the new saved image page as delta contents. At step 215, server program 124 sends a HTTP response comprising the delta contents. In response to determining that the saved image page for client 110 exists (YES branch of decision block 205), HTTP server program 124 retrieves, at step 207, the saved image page from image page repository 126.

Referring to FIG. 2, HTTP server program 124, at step 209, compares the current image page and the saved image page. HTTP server program 124 compares the whole contents of the current image page and the whole contents of the saved image page. For example, the whole contents include DOM tree contents and other sources such as linked image files. Based on the comparison result at step 209, HTTP server program 124 constructs, at step 211, delta contents between the current image page and the saved image page. At step 213, HTTP server program 124 updates the saved image page on image page repository 126 with the current image page.

At step 215, HTTP server program 124 sends a HTTP response to client 110. The HTTP response includes the delta contents based on the calculation of the delta at step 211. The delta contents included in the HTTP response include adding, removing, and/or modifying nodes of a DOM tree and how client 110 applies the delta. The DOM (Document Object Model) is a cross-platform and language-independent convention for representing and interacting with objects in HTML, XHTML and XML documents. In the DOM, a document has a tree structure which is called a DOM tree. For example, the structure of the delta contents can be defined as follows:

```
+nodeA<nodeA ancestor/location><node A content>
-nodeB<nodeB ancestor/location>
*nodeC<nodeC ancestor/location><node C content>
```

In the structure, +nodeA is used to add a new node in a DOM tree; it is followed by the location of nodeA (defining by its ancestor and sub path), and then followed by contents of nodeA. −nodeB is used to remove an existing node in a DOM tree; it is followed by the location of nodeB (defining by its ancestor and sub path). *nodeC is used to modify an existing node in a DOM tree; it is followed by the location of nodeC (defining by its ancestor and sub path), and then followed by new contents of nodeC.

Based on the delta contents, client 110 refreshes a HTTP page. The next paragraph discusses, with reference to FIG. 3, how the HTTP page is refreshed on client 110 in response to receiving the HTTP response sent from server 120 at step 215 in FIG. 2.

Figure 3:
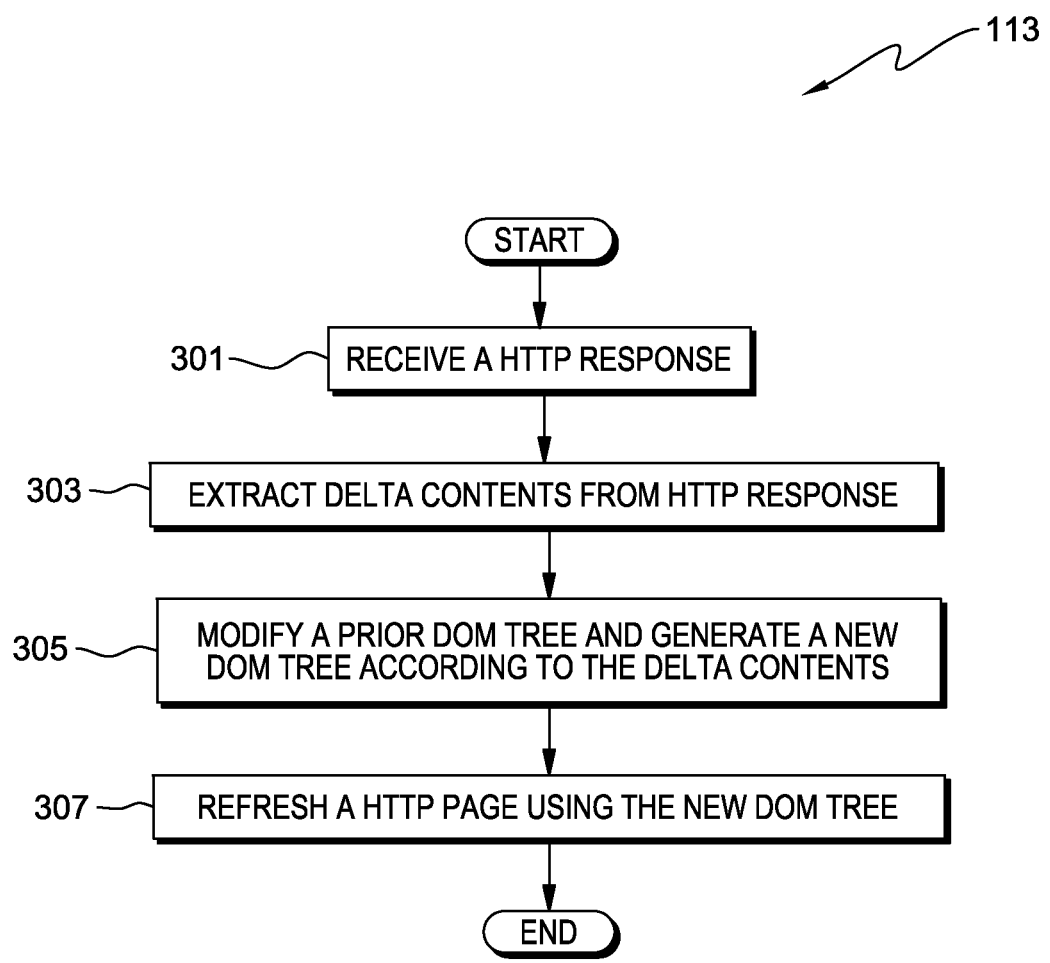
FIG. 3 is a flowchart illustrating operational steps of a page render program on the client shown in FIGS. 1A and 1B, in accordance with an exemplary embodiment of the present invention.

FIG. 3 is a flowchart illustrating operational steps of page render program 113 on client 110 shown in FIGS. 1A and 1B, in accordance with an exemplary embodiment of the present invention. At step 301, page render program 113 receives a HTTP response from server 120. The HTTP response contains delta contents which are described in a previous paragraph regarding step 215 of FIG. 2. At step 303, page render program 113 extracts the delta contents by parsing the HTTP response from server 120. At step 305, page render program 113 modifies a prior DOM tree and generates a new DOM tree, based on the delta contents. At this step, the new DOM tree is built by adding, removing, and/or modifying nodes as well as node contents of the prior DOM tree, according to the delta contents. At step 307, page render program 113 refreshes the HTTP page with the current image page, according to the new DOM tree.

Figure 4:
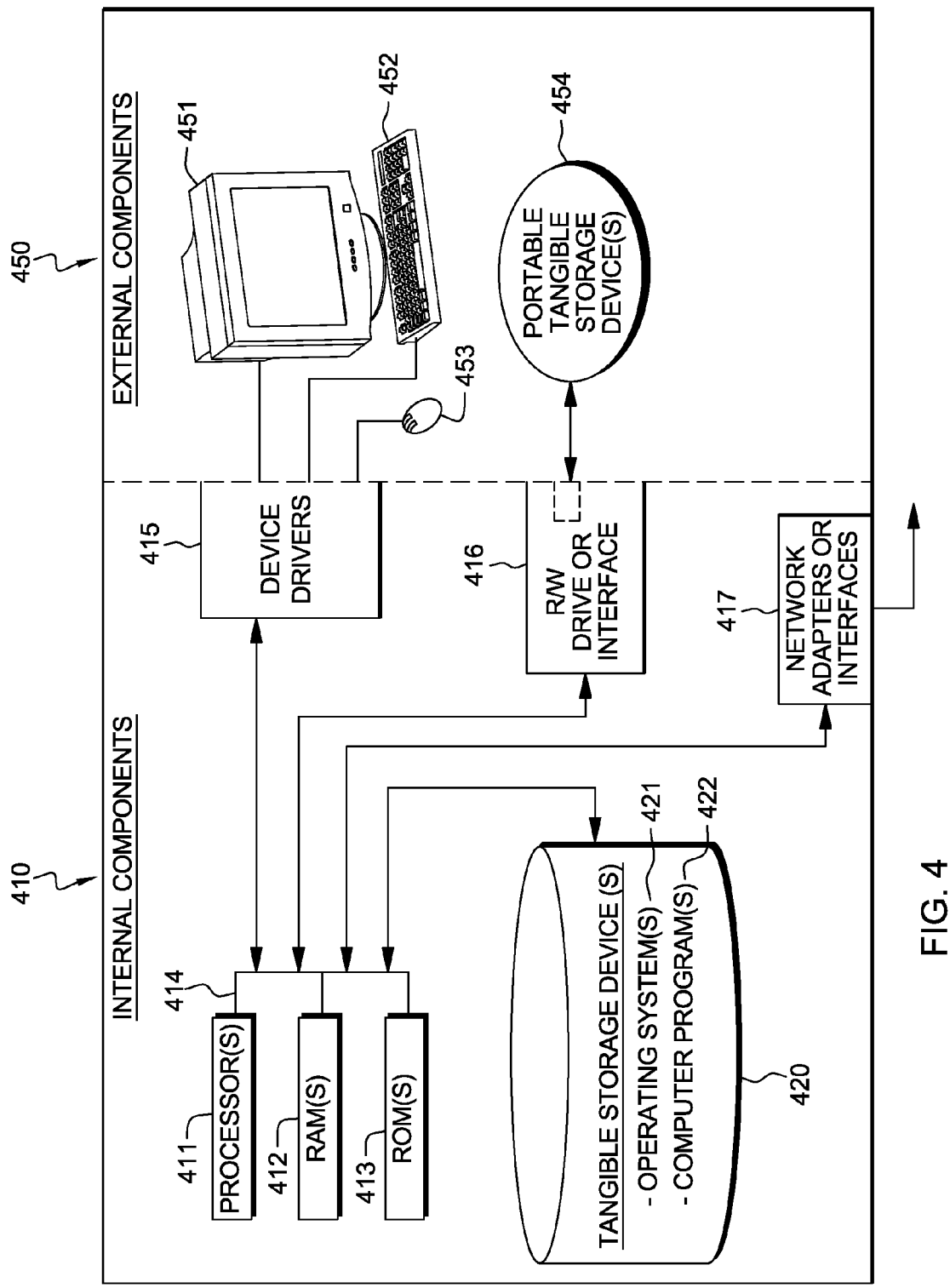
FIG. 4 is a block diagram illustrating internal and external components of the client or the server presented in FIGS. 1A and 1B, in accordance with an exemplary embodiment of the present invention.

FIG. 4 is a block diagram illustrating internal components 410 and external components 450 of client 110 or server 120 presented in FIGS. 1A and 1B, in accordance with an exemplary embodiment of the present invention. Each of the one or more sets of internal components 410 includes, on one or more buses 414, one or more processors 411, one or more computer-readable RAMs 412, and one or more computer-readable ROMs 413. Also, each of the one or more sets of internal components 410 includes one or more computer-readable tangible storage devices 420. One or more operating systems 421 and one or more computer programs 422 are located on one or more computer-readable tangible storage devices 420. One or more computer programs 422 on client 110 include web browser 111, page render program 113, and user interface 115 (shown in FIG. 1B). One or more computer programs 422 on server 120 include HTTP server program 124 (shown in FIG. 1B). One or more computer programs 422 are executed by one or more processors 411 via one or more computer-readable RAMs 412 (which typically include cache memory). Image page repository 126 (shown in FIG. 1B) of server 120 may be located on one or more computer-readable tangible storage devices 420 of server 120.

Each of the one or more sets of external components 450 includes a computer display monitor 451, keyboard 452, computer mouse 453, and portable computer-readable tangible storage device(s) 454.

Each of the one or more sets of internal components 410 includes R/W drive or interface 416 to read from or write to portable computer-readable tangible storage device(s) 454. Each of the one or more sets of internal components 410 includes device drivers 415 to interface to computer display monitor 451, keyboard 452, and computer mouse 453. Each of the one or more sets of internal components 410 includes network adapters or interfaces 417.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method implemented by a computer system for client-server communication based on delta transfer, the method comprising:

receiving, from a first client and by a server, a first HTTP request for transferring a current image page;

determining, by the server, that the first client does not have a client ID saved in a table on the server;

allocating, by the server, a new client ID to the first client and building server relationship entries in the table for the first client, in response to determining that the first client does not have a client ID saved in the table on the server, wherein the server relationship entries include the new client ID, a URL, an image page path, and a time stamp;

in response to determining that the new client ID is allocated, saving a new image page on a repository of the server, and sending the new image page as first delta contents in a HTTP response to the first client;

writing the new client ID into a cookie;

receiving, from a second client and by the server, a second HTTP request for transferring the current image page;

determining, by the server, that the second client has a client ID saved in the table on the server;

determining, by the server, that a saved image page for the client ID of the second client exists on the repository of the server, in response to determining that the second client has the client ID saved in the table;

retrieving, by the server, the saved image page from the repository, in response to determining that the saved image page for the client ID of the second client exists on the repository;

comparing, by the server, the current image page and the saved image page;

constructing, by the server, second delta contents between the current image page and the saved image page, wherein the second delta contents comprises at least one of an add operation and a modify operation, in addition to a location of an update defined by an ancestor and a sub path, and a content of an updated node;

updating, on the server, the saved image page with the current image page; and sending, from the server to the second client, a HTTP response comprising the second delta contents.

2. The method of claim 1, further comprising:

extracting, by the second client, the second delta contents, in response to receiving the HTTP response comprising the second delta contents;

modifying, by the client, a prior DOM tree to generate a new DOM tree, based on the second delta contents; and generating, on the client, the current image page, based on the new DOM tree.

3. The method of claim 1, wherein constructing the second delta contents is based on a comparison between whole contents of the current image page and whole contents of the saved image page.

4. A computer program product for client-server communication based on delta transfer, the computer program product comprising:

one or more computer-readable tangible storage devices and program instructions stored on at least one of the one or more tangible storage devices, the program instructions comprising:

program instructions to receive, from a first client and by a server, a first HTTP request for transferring a current image page;

program instructions to determine, by the server, that the first client does not have a client ID saved in a table on the server;

program instructions to allocate, by the server, a new client ID to the first client and to build server relationship entries in the table for the first client, in response to determining that the first client does not have a client ID saved in the table on the server, wherein the server relationship entries include the new client ID, a URL, an image page path, and a time stamp;

program instructions to, in response to determining that the new client ID is allocated, save a new image page on a repository of the server, and send the new image page as first delta contents in a HTTP response to the first client;

program instructions to write the new client ID into a cookie;

program instructions to receive, from a second client and by the server, a second HTTP request for transferring the current image page;

program instructions to determine, by the server, that the second client has a client ID saved in the table on the server;

program instructions to determine, by the server, that a saved image page for the client ID of the second client exists on the repository of the server, in response to determining that the second client has the client ID saved in the table;

program instructions to retrieve, by the server, the saved image page from the repository, in response to determining that the saved image page for the client ID of the second client exists on the repository;

program instructions to compare, by the server, the current image page and the saved image page;

program instructions to construct, by the server, second delta contents between the current image page and the saved image page, wherein the second delta contents comprises at least one of an add operation and a modify operation, in addition to a location of an update defined by an ancestor and a sub path, and a content of an updated node;

program instructions to update, on the server, the saved image page with the current image page; and program instructions to send, from the server to the second client, a HTTP response comprising the second delta contents.

5. The computer program product of claim 4, further comprising:

program instructions to extract, by the second client, the second delta contents, in response to receiving the HTTP response comprising the second delta contents;

program instructions to modify, by the client, a prior DOM tree to generate a new DOM tree, based on the second delta contents; and program instructions to generate, on the client, the current image page, based on the new DOM tree.

6. The computer program product of claim 4, wherein constructing the second delta contents is based on a comparison between whole contents of the current image page and whole contents of the saved image page.

7. A computer system for client-server communication based on delta transfer, the computer system comprising:

one or more processors, one or more computer-readable tangible storage devices, and program instructions stored on at least one of the one or more storage devices for execution by at least one of the one or more processors, the program instructions comprising:

program instructions to receive, from a first client and by a server, a first HTTP request for transferring a current image page;

program instructions to determine, by the server, that the first client does not have a client ID saved in a table on the server;

program instructions to allocate, by the server, a new client ID to the first client and to build server relationship entries in the table for the first client, in response to determining that the first client does not have a client ID saved in the table on the server, wherein the server relationship entries include the new client ID, a URL, an image page path, and a time stamp;

program instructions to, in response to determining that the new client ID is allocated, save a new image page on a repository of the server, and send the new image page as first delta contents in a HTTP response to the first client;

program instructions to write the new client ID into a cookie;

program instructions to receive, from a second client and by the server, a second HTTP request for transferring the current image page;

program instructions to determine, by the server, that the second client has a client ID saved in the table on the server;

program instructions to determine, by the server, that a saved image page for the client ID of the second client exists on the repository of the server, in response to determining that the second client has the client ID saved in the table;

program instructions to retrieve, by the server, the saved image page from the repository, in response to determining that the saved image page for the client ID of the second client exists on the repository;

program instructions to compare, by the server, the current image page and the saved image page;

program instructions to construct, by the server, second delta contents between the current image page and the saved image page, wherein the second delta contents comprises at least one of an add operation and a modify operation, in addition to a location of an update defined by an ancestor and a sub path, and a content of an updated node;

program instructions to update, on the server, the saved image page with the current image page; and program instructions to send, from the server to the second client, a HTTP response comprising the second delta contents.

8. The computer system of claim 7, further comprising:

program instructions to extract, by the second client, the second delta contents, in response to receiving the HTTP response comprising the second delta contents;

program instructions to modify, by the client, a prior DOM tree to generate a new DOM tree, based on the second delta contents; and program instructions to generate, on the client, the current image page, based on the new DOM tree.

9. The computer system of claim 7, wherein constructing the second delta contents is based on a comparison between whole contents of the current image page and whole contents of the saved image page.

\* \* \* \* \*